United States Patent
Stakutis et al.

(10) Patent No.: US 7,685,164 B2
(45) Date of Patent: Mar. 23, 2010

(54) LOW OVERHEAD METHODS AND APPARATUS FOR SHARED ACCESS STORAGE DEVICES

(75) Inventors: Christopher J. Stakutis, Concord, MA (US); Kevin M. Stearns, Wakefield, MA (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 11/736,489

(22) Filed: Apr. 17, 2007

(65) Prior Publication Data

US 2007/0208756 A1   Sep. 6, 2007

Related U.S. Application Data (63) Continuation of application No. 11/179,201, filed on Jul. 12, 2005, now Pat. No. 7,299,232, which is a continuation of application No. 09/687,668, filed on Oct. 13, 2000, now Pat. No. 7,010,532, which is a continuation-in-part of application No. 09/309,453, filed on May 11, 1999, now Pat. No. 6,161,104, which is a continuation of application No. 09/002,266, filed on Dec. 31, 1997, now Pat. No. 5,950,203.

(51) Int. Cl.
*G06F 17/00* (2006.01)

(52) U.S. Cl. .............. 707/104.1; 707/101; 707/102; 707/103 R (58) Field of Classification Search .............. 707/1–10, 707/100–104.1, 200–206
See application file for complete search history.

(56) References Cited

U.S. PATENT DOCUMENTS 5,136,707 A * 8/1992 Block et al. .................. 707/201

* cited by examiner

*Primary Examiner*—Isaac M Woo
(74) *Attorney, Agent, or Firm*—Rabindranth Dutta; Konrad Raynes and Victor LLP (57) ABSTRACT

Provided are implementations for improved access to information stored on a storage device. A plurality of first nodes and a second node are coupled to one another over a communications pathway, the second node being coupled to the storage device for determining meta data including block address maps to file data in the storage device, and the first nodes being configured for accessing file data from the storage device using said meta data, wherein at least one first node caches data including meta data for a file accessed by said first node. A file application on said first node is configured to get requested file data by accessing said cached data for the file. A file notification system sends a file change notification to said first node indicating changes affecting the cached data, wherein the file application on the first node inspects the change notification to determine whether to get the requested file data directly using said cached data, whereby file accesses may be effected for an extended time with data locally cached at first nodes of the system.

10 Claims, 4 Drawing Sheets

LOW OVERHEAD METHODS AND APPARATUS FOR SHARED ACCESS STORAGE DEVICES

CROSS-REFERENCE TO RELATED APPLICATIONS

This application is a continuation of application Ser. No. 11/179,201 filed on Jul. 12, 2005, which is incorporated herein by reference in its entirety.

Application Ser. No. 11/179,201 is a continuation of application Ser. No. 09/687,668 filed on Oct. 13, 2000, which issued on Mar. 7, 2006 as U.S. Pat. No. 7,010,532, which is a continuation-in-part of U.S. patent application Ser. No. 09/309,453, filed on May 11, 1999, which issued on Dec. 12, 2000 as U.S. Pat. No. 6,161,104, which is a continuation of U.S. patent application Ser. No. 09/002,266, filed on Dec. 31, 1997, which issued on Sep. 7, 1999, as U.S. Pat. No. 5,950,203, the teachings of all of which are incorporated herein by reference in their entirety.

BACKGROUND OF THE INVENTION

The invention pertains to digital data processing and, more particularly, to the sharing of disk drives and other storage devices on a networked digital data processing system. The invention has application, for example, in the processing of video, graphics, database and other files by multiple users or processes on a networked computer system.

In early computer systems, long-term data storage was typically provided by dedicated storage devices, such as tape and disk drives, connected to a central computer. Requests to read and write data generated by applications programs were processed by special-purpose input/output routines resident in the computer operating system. With the advent of "time sharing" and other early multiprocessing techniques, multiple users could simultaneously store and access data—albeit only through the central storage devices.

With the rise of the personal computer and PC-based workstations in the 1980's, demand by business users led to development of interconnection mechanisms that permitted otherwise independent computers to access one another's storage devices. Though computer "networks" had been known prior to this, they typically permitted only communications, not storage sharing.

Increased power of personal computers and workstations is now opening ever more avenues for their use. Video editing applications, for example, have until recently demanded specialized video production systems. Now, however, such applications can be run on high-end personal computers. By coupling these into a network, multiple users can share and edit a single video work. Reservation systems and a host of other applications also commonly provide for simultaneous access to large files by multiple parties or processes. Still other tasks may require myriad small files to be accessed by multiple different parties or processes in relatively short or overlapping time frames.

Network infrastructures have not fully kept pace with the computers that they interconnect. Though small data files can be transferred and shared quite effectively over conventional network interconnects, such as Ethernet, these do not lend themselves, for example, to sharing of large files. Thus, although users are accustomed to seemingly instantaneous file access over a network, it can take over an hour to transfer a sixty second video file that is 1.2 GBytes in length.

Some interconnects permit high-speed transfers to storage devices. The so-called fiber channel, for example, affords transfers at rates of up to 100 MBytes/sec—more than two orders of magnitude faster than conventional network interconnects. Although a single storage device may support multiple fiber channel interfaces, the industry has only recently set to developing systems to permit those workstations to share such files on a storage device. Moreover, when a file is to be accessed by multiple users, the overhead of server intervention can result in loss of speed advantages and efficiencies otherwise gained from the high-speed interface. In this regard, techniques such as locking, maintaining ghost files, monitoring file changes and undertaking multi-step access, check-in or housekeeping operations may be unworkable when multi-user access to many small files must be provided quickly.

In many situations, and for many specific types of networks, the coherence and security of a shared access storage system are desirable, but the nature of some of their usual storage transactions is ill-suited to such a file management protocol. For example, a web server application may commonly require hundreds or thousands of file-OPENs-per-second (FOPS) to be carried out on a small number of large graphic or web page files. Certain commercial transaction processing and reporting applications may require simultaneous access to read hundreds or thousands of files that are quite small, and some of these tasks may be carried out with tape systems, thus introducing long delays between opening of the files and completion of a processing task. The number of file-specific network communications involved in requesting, preauthorizing or monitoring and correcting data in these file transactions might bring a system to a standstill.

In view of the foregoing, an object of the invention is to provide improved digital data processing systems and, particularly, improved methods and apparatus of high-speed access to, and sharing of, disk drives and other storage devices on a networked computer system.

A related aspect of the invention is to provide such systems that achieve fast operation with files of diverse sizes.

A related aspect of the invention is to provide such systems as can be implemented with minimum cost and maximum reliability.

Yet another object of the invention is to provide such systems as can be readily adapted to pre-existing data processing and data storage systems.

Yet still another object of the invention is to provide such systems as can be readily integrated with conventional operating system software and, particularly, conventional file systems and other input/output subsystems.

SUMMARY OF THE INVENTION

One or more of the foregoing and other desirable objects are attained by the invention, which provides low overhead methods and apparatus for accessing shared storage on a networked digital data processing system.

A system according to one aspect of the invention includes a plurality of digital data processing nodes and a storage device, e.g., a disk drive, a "jukebox," other mass storage device or other mapped device (collectively referred to herein after as "disk drive," "storage device" or "peripheral device"). First and second ones of the nodes, which may be a client and a server node, respectively, are coupled for communication over a LAN, network or other communications pathway. Both the first and the second nodes are in communication with the storage device. This can be over the same or different respective logical or physical communications pathways.

By way of non-limiting example, the first node and the second node can be a client and a server, respectively, networked by Ethernet or other communications media, e.g., in a wide area network, local area network, the Internet interconnect, or other network arrangement. The server and/or client can be connected to the storage device via a SCSI channel, other conventional peripheral device channel, such as a fibre channel, "firewire" (i.e., IEEE 1394 bus), serial storage architecture (SSA) bus, high-speed Ethernet bus, high performance parallel interface (HPPI) bus or other high-speed peripheral device bus.

The first and second nodes function in the role of client and server, respectively, with respect to aspects of file access on the storage device. Thus, for example, the second or server node can obtain from the from the storage device or otherwise maintain administrative data, such as directory trees or file maps, pertaining to the storage of files on storage device. It can do so, for example, in its role as a complete file management system for the device or by interfacing a native file system on the storage device.

The first or client node maintains a local (or cache) copy of at least a portion of the aforementioned administrative data. This can be, for example, a file map or directory sub-tree for a file accessed by the node on the storage device. The data can be obtained in the first instance by the client node using conventional protocols for access to the storage device via the server or otherwise. Functionality (referred to below, as a "file application") executing on the client node determines whether the cached data remains current or otherwise valid. If so, the client node uses that data directly, thereby, minimizing further communications with and intervention by the server node. If not, the client node obtains updated data from the server node, e.g., again using the conventional protocols.

Further aspects of the invention provide a system as described above in which the client node caches file data (i.e., whole or partial contents of a file) in lieu of, or in addition to, administrative data relating to that file. Thus, for example, in addition to caching a directory sub-tree and block map for a file of interest, the client node can cache data read from the file.

Related aspects of the invention provide a system as described above in which the server node generates notifications (e.g., "change lists") identifying changes to administrative or file data. It is on the basis of these notifications, which may be communicated to the client node by publication or otherwise, that the client determines whether the cached data remains current or otherwise valid. By way of example, the server node can notify the client node of any changes to the storage device impacting a file opened for READ or WRITE access by the client. Likewise, where the client effects changes to a file on the storage device, it can itself publish a change list alerting the server or other nodes, so that respective portions of their local caches can be marked as invalid.

According to some aspects of the invention, a client node is automatically "registered" by the server to receive change lists for all files opened by it on the storage device. According to other aspects, the client node can register for notification of changes to selected files. Such registration, whether specified automatically or otherwise, can include a "saturation" level. In the event the specified file is changed more frequently than reflected by that level, the server node so notifies the client node which, thereafter, assumes that the relevant portions of its cache are always invalid. This obviates the need to further publish change lists for files that are "constantly" changing (i.e., changing more frequently than indicated by the saturation level).

Related aspects of the invention provide a system as described above in which the server node (or another node that publishes change lists) does not continue to publish notifications to a client node, until that client node has acknowledged that its cache is up-to-date in relevant regards. This obviates repeated publication of change lists to a client node that, for one reason or another, has not apparently responded to prior lists.

Systems of the type described above operate on the premise that large parts of the storage device's file system remain unchanged for a substantial time. Rather than servicing each request for file access by the client node, the server node publishes lists of file changes. Likewise, whenever possible, the client node utilizes its cache of administrative or other data, o answer its file needs, thereby obviating or reducing the need for interventions by or involvement of the server node. By having the client node, for example, directly mount the file system, access files and cache those files and related administrative data, the FOPS rate is improved by orders of magnitude. Network performance is not appreciably slowed in the few instances when files are found to be on the change/restricted list, since the relatively unchanging nature of the file system assures that this will generally occur less frequently.

In general, the systems of the present invention may operate with a network file management system capable of organizing and maintaining file storage and access operations in a multi-client network system. This may be a shared storage access network file management system, or LAN networking system.

The client and server nodes may include a file system of the type as described in the above-referenced United States patent, e.g., that executes on the first and second nodes; that is capable of responding to access requests by the client node for transferring data between that node and the storage device via the server node and a first communications pathway; and that responds to selected access requests by the client node by transferring data between that node and the storage device over a possibly separate communications pathway.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
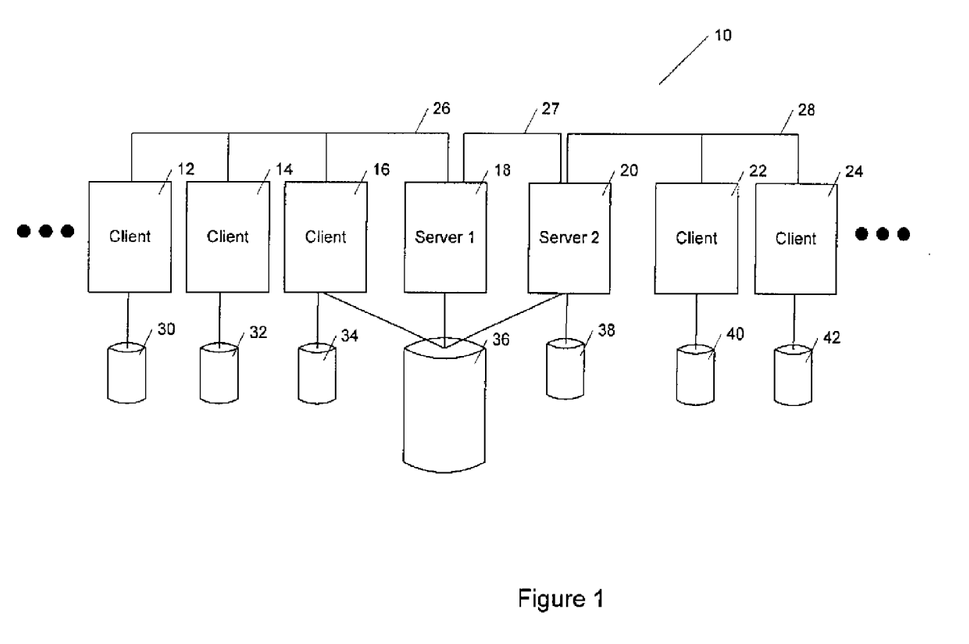
FIG. 1 depicts a storage area network of the type with which the invention may be practiced.

In FIG. 1 depicts a scaleable networked digital data processing system of the type used to practice the invention. The system 10 includes a plurality of nodes 12-24, including two server nodes 18, 20 coupled via network pathways 26, 28 to client nodes 12-16 and 22-24, as shown. Server nodes 18, 20 are additionally coupled to one another via network pathway 27.

In the illustrated embodiment, nodes 12-24 represent digital data processing apparatus or other devices capable of being coupled to one another in a network and, more particularly, by way of example, in a client-server configuration. Illustrated server nodes 18, 20 represent mainframe computers, workstations, personal computers, or other digital data processing apparatus capable of providing server functions in such networks and, particularly, of controlling access to shared peripheral devices, such as storage device 36. Nodes 12-16 and 22-24 likewise represent workstations, personal computers, dedicated devices, or other digital data processing apparatus that generate requests for access to such shared peripheral devices.

The network pathways 26-28 represent wire cable interconnects, wireless interconnects, point-to-point interconnects, Internet interconnects or other digital communications interconnects of the type known in the art. Those pathways can be configured in any configuration that permits a node 12-16, 20-24 requesting access to a shared peripheral device 36 to communicate that request to a node 18 controlling access thereto. For purposes hereof and unless otherwise evident from context, such a requesting node is referred to as a "client," regardless of its role (i.e., as a client or server) in the conventional network defined by nodes 12-18 and pathway 26, or nodes 20-24 and pathway 28. Thus, for example, node 18 could be a "client" to node 16 for purposes of sharing peripheral device 34, presuming an auxiliary connection (e.g., fiber channel) were provided between node 18 and that peripheral device.

In the illustrated embodiment, nodes 12-24 operate under the Microsoft Windows NT operating system, though those skilled in the art will appreciate that the nodes 12-24 may utilize other client and server operating systems, as well. Moreover, it will be appreciated that nodes need not utilize the same operating systems. Thus, for example, server 18 may operate as a Windows NT-based server, while server 20 operates as a UNIX-based server. The invention is therefore seen to have the advantage of permitting multiple nodes of different pedigrees, or operating system types, to access files on a common peripheral device.

With further reference to FIG. 1, the nodes 12-24 are coupled to respective dedicated storage devices 30-42, as shown. Such couplings are provided by SCSI channels or other device interconnects suitable for permitting the nodes to transfer information with such devices. In addition to being coupled to their own dedicated storage devices 34, 38, nodes 16, 20 are coupled to the storage device 36 that is controlled by node 18. In the parlance of the invention, nodes 16, 20 are referred to as "clients" and node 18 is referred to as a "server."

Coupling between the clients 16, 20 and the shared peripheral device 36 can be provided by any conventional peripheral device interconnect, though, preferably, it is provided by high-speed interconnects such as fibre channel, "firewire" (i.e., IEEE 1394 bus), serial storage architecture (SSA) bus, high-speed Ethernet bus, high performance parallel interface (HPPI) bus or other high-speed peripheral device bus.

Figure 2:
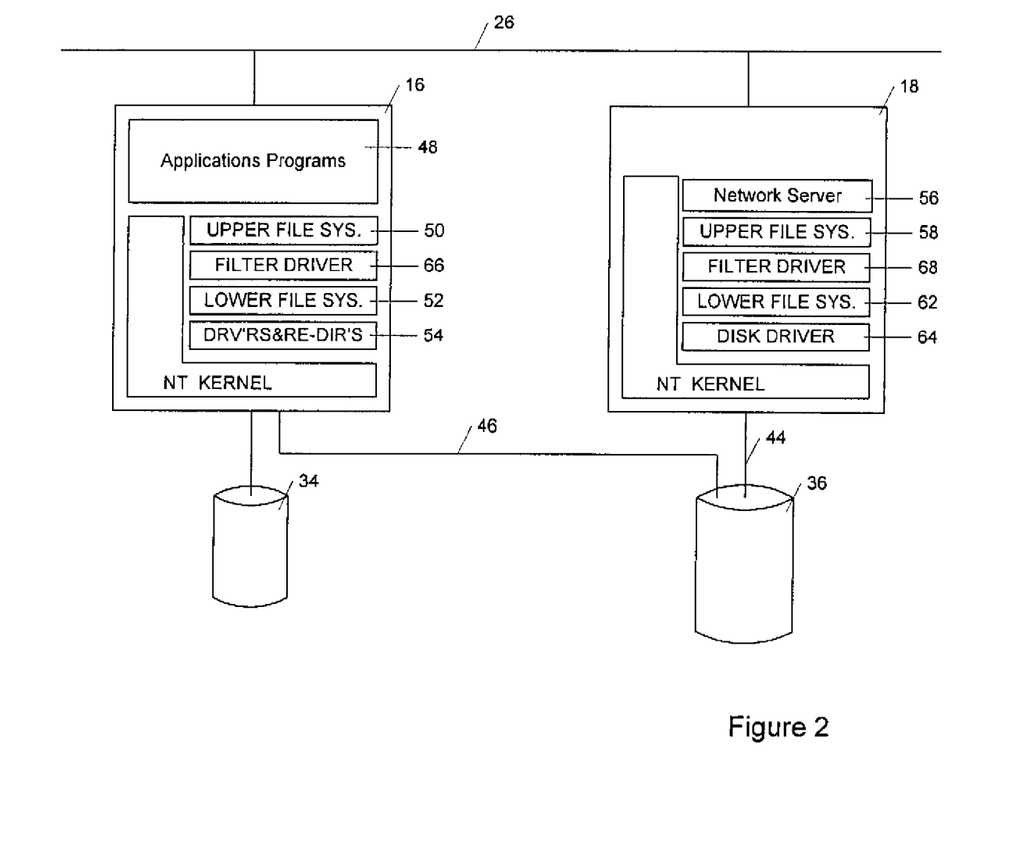
FIG. 2 depicts a software architecture of exemplary nodes in a system according to FIG. 1.

FIG. 2 depicts further detail of a hardware and software architecture permitting low overhead access to files on a shared peripheral device 36 by nodes 16, 20 in a system according to the invention. Though the discussion that follows is directed to access among these devices, those skilled in the art will appreciate that the teachings can be applied equally to file access on any of storage devices 30-32 by any of the nodes 12-24 to which they are directly or indirectly coupled.

Referring to the drawing, nodes 16, 18 are coupled to one another via communications pathway 26 and to peripheral device 36 via pathways 44, 46, respectively. As noted above, pathway 44 (coupling device 18 to peripheral 36) can be a SCSI channel or other conventional peripheral device interconnects. Likewise, as noted above, pathway 46 (coupling device 16 to peripheral 36) can be a conventional peripheral device interconnect, though, preferably, is a high-speed interconnect such as fibre channel, "firewire" (i.e., IEEE 1394 bus), serial storage architecture (SSA) bus, high-speed Ethernet bus, high performance parallel interface (HPPI) bus or other high-speed peripheral device bus.

Executing on node 16 are one or more applications programs 48 (e.g., including video editing programs, image analysis programs, and so forth) that generate requests for access to local and networked peripheral devices, including shared device 36. Those applications programs execute in the conventional manner under the control of an operating system, e.g., Windows NT, which includes a file system that services those access requests.

In the illustration, that file system is represented by elements 50-54, including "upper" file system 50, representing the Windows NT I/O Subsystem Manager and other components responsible for interfacing with applications programs 48 and for routing peripheral device access requests to the file system; "lower" file system 52, representing the Windows NT File system drivers and intermediate drivers and other components responsible for local, disk-based file systems, SCSI drivers and the like providing generic functionality to a common set of devices; and drivers 54, representing software (and hardware) components for transferring information to and from attached peripheral devices 34, 36.

Because node 16 is a client vis-à-vis the Windows NT network, the drivers also include a network redirector, such as the Windows NT LANManRedirector, that transfers access requests to and from the shared peripheral device 36 via server node 18 and pathways 26 and 44. The node 18, which includes network server component 56, handles such requests in the conventional manner of a server of a networked digital data processing system. As illustrated, node 18 also includes a file system, comprising elements 58-64, whose operations parallel those of components 50-54 on the node 16.

Though the illustrated architecture for node 16 is in accord with that dictated by Windows NT, those skilled in the art will appreciate that the invention may be embodied in devices running under other operating systems, as well.

The illustrated system allows multiple client nodes to access files on a shared peripheral device with minimal overhead and with coordination of a server node for that device. A server node is used in this approach to notify the clients of changes to administrative (or meta) data and file data cached by them. A direct connection, or "directly attached disk connect" can be provided between each node and the shared device to permit certain operations, e.g., bulk reads and writes, to be accomplished directly between the nodes and the peripheral device. The illustrated embodiments provide this capability through communications pathways such as pathway 46 and through filter drivers 66, 68 incorporated into the file systems. The direct connection may be physically separate from the network connection provided between the nodes or it may be logically separate, e.g., carried by the same physical conductor set as the network connection via high-speed switches and/or pathways.

In the discussion that follows, unless otherwise evident from context, the term "file system" refers in this context to the combined operation of the nodes' native file systems (e.g., comprising elements 50-54 and 56-64) and of the network server, e.g., 56., and file system, e.g., 56-64, of the node to which the shared peripheral device is assigned and of the file system, e.g., 50-54 of the node that shares that device. The storage device 110 stores data, e.g., files, records, data structures, or other ordered data, any of which shall generically be referred to herein as a "file".

The context and operation of the illustrated system will be better understood following a brief discussion of an implementation of shared storage access in a network. In a conventional network shared-access system, the server and the meta data controller (MDC) for a storage device is the only unit that hard-mounts a volume, lays down a file system and manages that file system for that storage device. In one respect, a server MDC is somewhat like a file-server for a volume; other machines may use conventional networking to access the volume and thus are authenticated and controlled in the traditional networking model. However, server communications on the network involve only meta data (file open, security, allocation information, etc). The meta data is transferred via the server over the network the actual file payload or data content may be transferred directly between the client nodes and the storage elements.

This arrangement, while greatly speeding up the shared processing of large files, has a certain amount of overhead associated with it. Generally each node or client must effect certain communications through the MDC, requesting meta data and reporting file closing and change data. The server may be the only node that can write files, employing a single cache for storing and monitoring all outstanding maps and files, and requiring that the data be passed through the server.

When files are large, e.g., over 100 kilobytes, the overhead of the multiple required network communications for authorization, tracking and housekeeping may appear negligible. However, for file sizes under 10 kilobytes, a UNIX server may be expected to perform 15,000 file opens per second (FOPS), and a conventional network-based file system may approach 1500 FOPS. Interposition of a shared access file management system, or a distributed lock system, may reduce the rate even below this normal network speed, e.g., to only several hundred FOPS.

This slowing down may appear unavoidable, because when many smaller files are opened in a short time, any cached data and meta data for these files may quickly become inaccurate, requiring extensive housekeeping and/or communications over the network. Thus, the ability to provide shared access, while offering dramatic efficiency for large files, carries a penalty that becomes more onerous for accessing smaller files. The disparity between FOPS rates achievable with and without a shared storage file management system is especially great when one considers tasks such as simple open-to-read file accesses, or other circumstances commonly arising in web server applications, information mining and networked processing situations.

This problem is addressed in the illustrated embodiment by providing caches for meta data and data in the client nodes and by publishing messages that allow the caches to be maintained and used as long as possible for direct file access. It may in further aspects minimize messaging required to maintain those caches. Briefly, a client node OPENing or otherwise requesting a file receives meta data, i.e. block address data, from the server or file system meta data controller. The client stores this in a local cache or in a cache otherwise dedicated to that node. The client may use the cached data directly, e.g., to access the desired file(s) on the storage device. File data obtained as a result of those accesses is cached as well, by the clients. The server, which operates as, or interfaces with, a file system meta data controller to perform housekeeping necessary for file coherence, storage allocation efficiency and the like, publishes to the client nodes change lists indicating whether changes have been made to the file system that may affect meta data or file data cached by the client nodes. A file application on each client consults the change list to determine whether the client may utilize portions of its cache or fresh meta data or file data must be obtained (e.g., from the server or via direct access to the storage device.)

Figure 3:
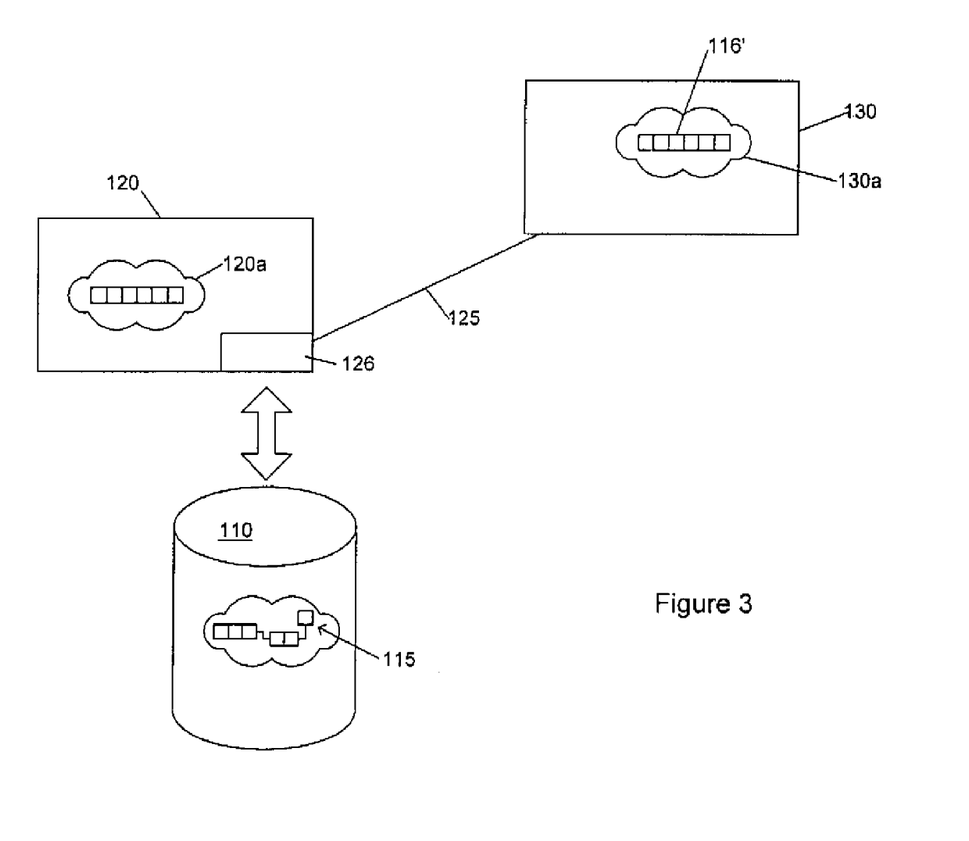
FIG. 3 depicts caching and notification in a system according to the invention.

FIG. 3 schematically illustrates a system 100 in accordance with the present invention operating to increase speed of a shared access network system. As shown, a system of the invention includes a storage unit 110, and a host 120 connected to the storage unit and operating with a file storage protocol to permit and control access to at least some of the data in the storage unit 110. The system further contains client nodes 130, e.g., user workstations or terminals in a network, of which one client node is illustrated. Those skilled in the art will readily appreciate that server 120 corresponds, for example, to server 18 of FIG. 1; storage device 110, to peripheral device 36; network 100 to networks 26-28; and nodes 130 to client nodes 12-24.

Initially, a client node 130 requests access to a file, e.g., by a file OPEN operation, and the server node 120 provides meta data. This may include, for example, an identification of one or more particular disks, offsets, sector or block information and the like that allows the node 130 to directly mount the storage device 110 and access the file contents in the collection of block storage locations 115 for that file. The node 130 stores this meta data to local cache 130a and uses it to access the file, filling out the cache 130a with further meta data and file data acquired in the process. FIG. 3 schematically shows a stored group of blocks of data 115 in the storage unit 110 corresponding to a requested file, and the corresponding locally cached data 116' which reside in the client 130 cache memory once the file has been opened. The locally cached meta data in cache 130a, e.g., block addresses, offsets, network path, directory or other "map" for the file in storage, is indicated schematically by a shaded portion. The cached data may also include (if the node 130 has recently opened the file) all or portions of the contents of the file (referred to above as "file data".) The local cache may be constructed in a conventional way as files are accessed and used in the node 130, and the meta data and file data are located near or adjacent in the cache of the client node 130.

The server MDC node 120 has a local cache, which may for example include a copy of the file contents, the block addresses, and other meta data. However, the server meta data may be more extensive, including much meta data related to its MDC file management and message coordination functions. Furthermore, the server file copy (if any) may be resident only while the server is coordinating transactions related to the file; generally, when an accessing node has closed the requested file, and other transactions intervene from additional client nodes, server cache will be taken over by current processing and monitoring tasks.

The nodes 130 may connect over a network 125 such as a LAN to a file management system 126 associated with the storage device 110. The file management system in a shared storage access network system may involve a native meta data controller (MDC) 126 together with an interface layer on node 120 that allows the server 120 to acquire map data from the storage device and coordinate the operations that occur over the network 125 with the file and storage unit management operations that must be carried out in the storage device 110.

Figure 4:
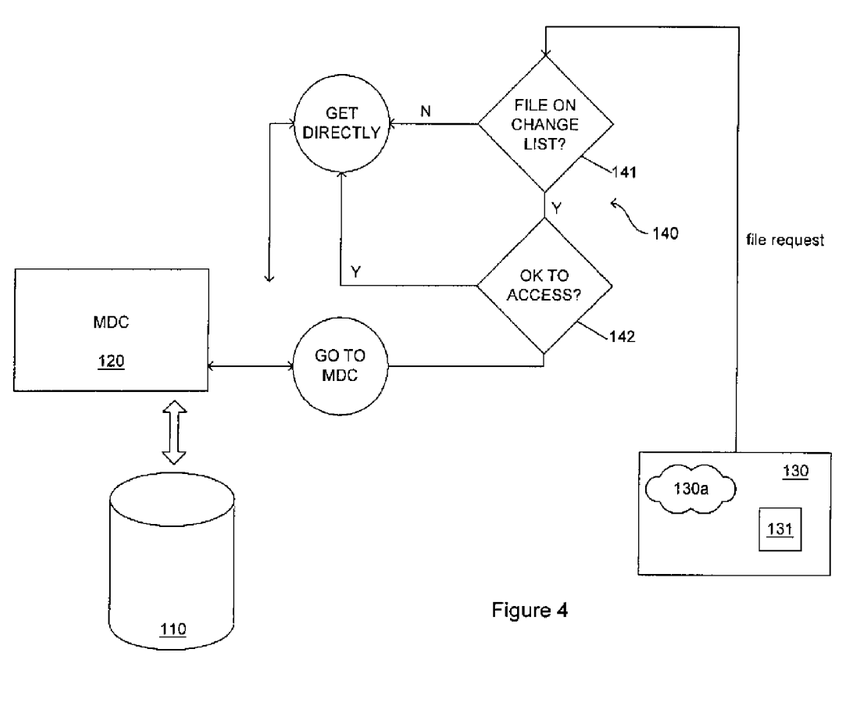
FIG. 4 depicts a client node file application operating in a system according to the invention.

In operation of the present invention, the client node caches 130a may independently subsist, and a file access application running on the client 130 may access data and meta data, as appropriate when the node 130 again requires access to the file. Thus, as shown in FIG. 4, the file application may answer a file open request within the node 130 by simply providing the file contents 116 still present in the locally cached data 116', or by utilizing the corresponding meta data cached in 116' to directly access the storage device 110.

The server MDC 120 may effect this ongoing access only indirectly, which it does by the mechanism of publishing a change list that is transmitted to the client node 130 and that identifies the files or meta data that have changed and may be no longer valid. The client copy of the change list 131 is stored on the node 130, and a file application 140 on the client node 130 in turn consults the change before determining whether to use the cached data, or meta data, or to revert to carrying out a file transaction through the server 120.

Thus, in the present system, the client machines use ordinary networking to directly mount the volumes and open files. However, as files or meta data change, portions of the locally cached directory are restricted by the change lists. The local file application may automatically revert to the shared access protocol for requesting meta data from the server 120, or it may implement a decision algorithm that determines whether the locally cached data may still be used. From another perspective, the direct-access system of the present invention employs a shared-access MDC/server file management protocol, but extends the period of use or direct access, and greatly speeds up the accession of files by allowing client nodes to each maintain a natural cache with meta data and directly mount the file system until or unless the cache becomes invalid or suspect. FIG. 4 illustrates such an embodiment of the invention, operating with a SAN MDC server node to also permit host-mediated accesses, but to generally minimize the instances when this will be necessary. It will be understood that the file application running on the client may intercept reads and writes, and issue those directly to the disk elements, while coordinating with the host MDC (regarding caching) and asking the MDC for the list of physical blocks (i.e., a map) for each desired file. In accordance with a principal aspect of the present invention, such structure, if provided, is not the default structure. Instead, the client nodes are permitted to maintain data maps and directly mount the file system except for a limited number of changed files. After an initial file access, the server MDC 120 functions primarily to mediate file access in the small number of cases where intervening file changes or storage reallocations have superceded the locally cached file data and meta data.

In further embodiments, the server MDC 120 may further effect communications with nodes 130 over the network to enable local file applications to remove locally cached data or prevent its reappearance when there have been intervening file changes, or even to reconstitute or correct local cached meta data.

This operation is indicated generally in FIG. 4. Notifications from node 120 over the network 125 between the MDC 120 and the client node 130 form a change list 131 at each client 130. A file application 140 running on the client intercepts file READ or WRITE calls and performs a check 141 on each file request to determine whether the file is on the change list 131. If not, the client proceeds to access the file directly using its locally-cached content if present, or applying the locally-cached meta data to access the desired blocks in storage 110. Otherwise, that is, if the file does appear on the change list, the file application may proceed to a further determination 142, to determine whether direct access is nonetheless appropriate. This allows a local or even a context-dependent determination to be made, for example, on whether a locally cached file copy is still the appropriate version for the task at hand (for example if the listed changed blocks are outside the region to which access is desired). In lieu of making such further determination 142, the client file application may simply be configured to proceed to obtain the file by a separate request to the node 120, without further inquiry. In that case, the client 130 may, for example, simply request the file from the node 120 through the SAN protocol, i.e., and thus acquire fresh meta data or data block maps to locate the changed file data locations in storage.

In various further embodiments, the client file system may undertake communications and local processing to either purge change-listed data and meta data from cache, or to rewrite cache to update the necessary access data.

As noted above, to request a file, the client 130 passes a file request to a file access application 140 running on the client that consults the list 131, and either directly accesses the storage unit 110 (if the desired file is not on list 131) or implements a further decision or the MDC-mediated access protocol (if the file is on list 131). The restriction list 131 may be, briefly, a list of files, or directories or data blocks, which are not to be accessed via locally cached data. It may include also restrictions due to user authority limitations or the like that are specific to a particular client node, or to a class of client nodes. Preferably, however, the notification is simply a change list, published and updated by the MDC 120, that indicates specific portions of the local cache that may be superceded or inaccurate due to changes in the stored file. The notifications and list may be specific to the client 130 (when, for example a specific node is only configured for working with data from specific directories or has limited authority to access data), or it may be identical for several or for all client nodes.

The "server" MDC 120 may monitor the file storage to detect all file writes or identify changes in files and their storage addresses, to publish the change lists 131, which are received and cached by the client nodes 130. This assures that the node 130 does not use out-dated locally-cached meta data or data, and that the MDC is able to maintain integrity and coherence of data files that have been moved or modified. However, the invention is not limited to SANergy-type file management systems, but may be advantageously applied to any network file system to integrate direct mounting of the storage device and greatly enhanced speed for a substantial portion of the file access transactions. Thus, the invention extends a conventional file management system.

Applicant has identified this file system enhancement by the acronym ZOOM, denoting zero-overhead, zero meta data, since in a simple implementation the system entirely dispenses with network transfers of an extra layer of meta data that would be used for coordination between the nodes, file versions and required transactions through the MDC for routine file accesses, and relies on locally cached meta data for directly mounting the file system, or on locally cached file data. In general, it will be very efficient for the client to resort to a server-mediated access protocol such as the SANergy system, for accessing the few needed files which may appear on the list 131.

When used in conjunction with a shared access file system as described in the aforesaid U.S. patent, the file manager may include a bypass mechanism, which executes on at least the client node, to intercede in the response to at least selected input/output, or access, requests generated by that node, and transfer data designated by such requests directly between the client node and the storage device, in lieu of transferring that data via the server. Such transfers by the bypass are made using the administrative information maintained by the file system relating to storage of such data on the peripheral device. The bypass can intercede in response to requests by the applications programs executing on the client node to read or write data on the peripheral device. Rather than permitting the file system to transfer that data via the server node and network, the bypass transfers it directly to the peripheral device. A further understanding of these and other aspects of this aspect of the system may be attained by reference to the aforesaid patent, the teachings of which (as noted above) are incorporated herein by reference.

The foregoing description sets forth methods and apparatus meeting the objects identified above. In a principal aspect the directly-mounted file system approach of the present invention inverts a conventional file management tenet by requiring notifications of changes be sent to the client nodes, rather than using centrally-monitored change data as the basis for a centrally-implemented housekeeping and control process. The change list notification procedure of the present invention is compatible with a great number of file management systems, and may increase FOPS rates by one or more orders of magnitude for the great preponderance of file accesses. Moreover, in relying on client file applications to initially determine the access protocol, the present invention allows task- or client-specific determinations as to the level of change or corruption that may occur without detriment, offering greater flexibility for diverse applications. Those skilled in the art will appreciate that the illustrated embodiment is shown and described merely by way of example and that other embodiments incorporating changes therein fall within the scope of the invention, of which we claim:

What is claimed is:

1. A digital data processing system, comprising
a first node and a second node coupled for communication:
a storage device coupled for communication with at least the first node and the second node; and
a cache memory coupled to and associated with the first node, the cache memory storing administrative data pertaining to files on the storage device, wherein the second node sends a change notification to notify the first node of changes to administrative data pertaining to files for which the cache memory stores administrative data, and wherein:
a change list in the first node stores the change notification;
intercepting, at the first node, a request for requested blocks of a selected file; and
in response to determining at the first node that the selected file is indicated in the change list and that changed blocks indicated in the change list are outside of a region corresponding to the requested blocks of the selected file, the requested blocks are obtained by the first node by accessing the cache memory.

2. The digital data processing system of claim 1, wherein the storage device is any of a disk drive, a "jukebox," other mass storage device or other mapped device.

3. The digital data processing system of claim 1, wherein the administrative data stored by the cache includes any of a physical storage map and at least a portion of a directory pertaining to files on the storage device.

4. The digital data processing system of claim 1, wherein the digital data processing system comprises a network having a file management system, and a file application on the first node applies administrative data in the cache memory pertaining to a file to directly mount the storage device.

5. The digital data processing system of claim 1, wherein the digital data processing system comprises a network having a file management system, and a file application applies a notification of a change of administrative data pertaining to a given file by passing a request for that file by the first node to the file management system.

6. A method of sharing storage access in a digital data processing system having a first node and a second node coupled for communication and a storage device coupled for communication with at least the first node and the second node, the method comprising:
caching in a cache memory coupled to and associated with the first node, administrative data pertaining to files on the storage device;
communicating via a change notification, to the first node, changes to administrative data pertaining to files for which the cache memory stores administrative data;
storing the change notification in a change list in the first node;
intercepting, at the first node a request for requested blocks of a selected file; and
in response to determining at the first node that the selected file is indicated in the change list and that changed blocks indicated in the change list are outside of a region corresponding to the requested blocks of the selected file, obtaining the requested blocks, by the first node, by accessing the cache memory.

7. The method of claim 6, wherein the storage device is any of a disk drive, a "jukebox," other mass storage device or other mapped device.

8. The method of claim 6, wherein the administrative data stored by the cache includes any of a physical storage map and at least a portion of a directory pertaining to files on the storage device.

9. The method of claim 6, wherein the digital data processing system comprises a network having a file management system, and a file application on the first node applies administrative data in the cache memory pertaining to a file to directly mount the storage device.

10. The method of claim 6, wherein the digital data processing system comprises a network having a file management system, and a file application applies a notification of a change of administrative data pertaining to a given file by passing a request for that file by the first node to the file management system.

* * * * *